UNITED STATES PATENT OFFICE.

WILLIAM F. SIMES, OF PHILADELPHIA, PENNSYLVANIA.

DISINFECTANT.

SPECIFICATION forming part of Letters Patent No. 433,877, dated August 5, 1890.

Application filed May 1, 1890. Serial No. 350,186. (Specimens.)

*To all whom it may concern:*

Be it known that I, WILLIAM F. SIMES, a citizen of the United States, residing in the city of Philadelphia, State of Pennsylvania, have invented a new and useful Improvement in Disinfectants and Moth Preventives, of which invention the following is a specification.

This invention consists of a composition of naphthaline, oil of camphor, and a saponifier, substantially as below specified. The camphor-oil without addition qualifies or overcomes the offensive odor of the naphthaline; but there being no chemical union between these two substances when mixed together the composition resulting from the mixture is not susceptible of general use as a moth preventive because its free oil is liable to occasion stains. To overcome that defect I use in connection with the other ingredients caustic soda sufficient to saponify the camphor-oil.

In the preparation of said improved composition I use the ingredients aforesaid in the proportions substantially as follows, viz: To five ounces of camphor-oil I add one ounce of caustic soda of seventy per cent. and seven ounces of water. I boil the caustic soda in the water until dissolved, and while it is boiling I add to it the camphor-oil. The result is a camphor-soap. I then add four ounces of this soap to each pound of naphthaline and heat and stir the mixture until the ingredients are thoroughly incorporated. The resulting composition may be molded while warm, or it may be compressed when warm or cold into cakes, blocks, tablets, lozenges, or other forms of the desired size. It is obvious that the quantity of caustic soda required to saponify the oil will vary with the strength of the caustic soda.

I claim—

A disinfectant and moth preventive composed of naphthaline, oil of camphor, and caustic soda in the proportions substantially as set forth.

WILLIAM F. SIMES.

Witnesses:
   J. E. SHAW,
   CLIFFORD E. LARZELERE.